US012621368B2

(12) United States Patent
Fischer et al.

(10) Patent No.: US 12,621,368 B2
(45) Date of Patent: May 5, 2026

(54) METHOD FOR CONFIGURING A COMMUNICATION NETWORK FOR THE CYCLICAL TRANSMISSION OF MESSAGES

(71) Applicant: SIEMENS AKTIENGESELLSCHAFT, Munich (DE)

(72) Inventors: Thomas Fischer, Erlangen (DE); Stephan Höme, Schwabach (DE); Konstantin Jung, Feucht (DE); Sven Kerschbaum, Fürth (DE); Marcel Kießling, Bayern (DE); Frank Volkmann, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 512 days.

(21) Appl. No.: 17/609,128

(22) PCT Filed: May 6, 2019

(86) PCT No.: PCT/EP2019/061506
§ 371 (c)(1),
(2) Date: Nov. 5, 2021

(87) PCT Pub. No.: WO2020/224753
PCT Pub. Date: Nov. 12, 2020

(65) Prior Publication Data
US 2022/0417335 A1     Dec. 29, 2022

(51) Int. Cl.
*H04L 67/55*     (2022.01)
*H04L 41/0604*     (2022.01)
(Continued)

(52) U.S. Cl.
CPC .......... *H04L 67/55* (2022.05); *H04L 41/0604* (2013.01); *H04L 41/12* (2013.01); *H04L 67/12* (2013.01); *H04L 67/2866* (2013.01)

(58) Field of Classification Search
CPC ..... H04L 41/0604; H04L 67/60; H04L 67/12; H04L 67/55; H04L 41/12; H04L 63/102
See application file for complete search history.

(56) References Cited

U.S. PATENT DOCUMENTS 11,287,793 B2 *   3/2022  Kojima ................ G05B 19/054
2003/0163713 A1 *  8/2003  Cocchi ............... H04N 21/6143
                                                      713/189
(Continued)

FOREIGN PATENT DOCUMENTS

EP          2355403 A1     8/2011
WO      2018100509 A1     6/2018

OTHER PUBLICATIONS

International Preliminary Report on Patentability for International Patent Application PCT/EP2019/061506 mailed Apr. 14, 2021.
(Continued)

*Primary Examiner* — Schquita D Goodwin
*Assistant Examiner* — Linh T. Nguyen
(74) *Attorney, Agent, or Firm* — Lempia Summerfield Katz LLC

(57) ABSTRACT

The invention relates to a method for configuring an industrial real-time-capable communications network for the cyclical transmitting of messages (NWM), each comprising one or more data sets (DS1, . . . , DS4). The communications network (1) comprises a message source (10) for generating and cyclically sending the messages (NWM), at least one message sink (16, 17, 18) for receiving and processing the messages (NWM), as well as at least one network component (12, 14) which forwards messages (NWM) from the message source to the message sinks. The configuring comprises determining (S1) a network topology of the communications network (1) for the transmitting of a data stream to be sent from the message source (10) in the future, in which the messages (NWM) are each cyclically sent with
(Continued)

Message Sinks   16
Communication Network 1
NWM
1 2 3 4
DS   NWM
Network Components
Filter
12 12F   NWM
1 2 3 4   1 3 4
NWM
3 4
Network Components 14
Message Source 10
NWM
1 2
NWM
1 3
14F Filter
Message Sinks 17   18
Message Sinks all data sets. It is determined (S2) which of the data sets in the data stream a respective one of the message sinks wants to receive. In addition, a respective filter (12F, 14F) is determined (S3) and designed (S4) for each network component, whereby, from the network topology, the components connected to the respective network components and the data sets required for the connected message sinks are determined. In this way, during operation of the communications network (1), exclusively required data sets are transmitted in the messages (NWM) in a downstream direction of the data stream.

20 Claims, 2 Drawing Sheets

(51) Int. Cl.
| | | |
|---|---|---|
| *H04L 41/12* | (2022.01) | |
| *H04L 67/12* | (2022.01) | |
| *H04L 67/2866* | (2022.01) | |

(56) References Cited

U.S. PATENT DOCUMENTS

| | | | | |
|---|---|---|---|---|
| 2004/0032871 | A1* | 2/2004 | Sharon | H04L 27/0002 375/222 |
| 2007/0245018 | A1* | 10/2007 | Bhola | H04L 51/00 709/225 |
| 2011/0103382 | A1* | 5/2011 | Kim | H04L 12/2874 370/390 |
| 2015/0281335 | A1 | 10/2015 | Heine et al. | |
| 2018/0248825 | A1* | 8/2018 | Sedan | H04L 51/214 |
| 2018/0337840 | A1 | 11/2018 | Goyal et al. | |
| 2019/0305944 | A1* | 10/2019 | Gabriel | H04L 63/1466 |
| 2019/0319836 | A1* | 10/2019 | Dos Santos | H04L 47/0458 |
| 2020/0099762 | A1* | 3/2020 | Eckhardt | G05B 19/4186 |
| 2020/0195501 | A1* | 6/2020 | Shenoy | H04L 41/0863 |
| 2021/0400524 | A1* | 12/2021 | Kahn | H04L 65/80 |

OTHER PUBLICATIONS

OPC Foundation: OPC Unified Architecture Specification Part 14: PubSub Release 1.0411, XP055522628, URL: https://opcfoundation.org/developer-tools/specifications-unified-architecture/part-14-pubsub; 2018; pp. 1-164.

PCT International Search Report and Written Opinion of International Searching Authority mailed Jan. 23, 2020 corresponding to PCT International Application No. PCT/EP2019/061506.

Gutiérrez, Marina, et al. "Self-configuration of IEEE 802.1 TSN networks." 2017 22nd IEEE international conference on emerging technologies and factory automation (ETFA). IEEE, 2017. pp. 1-8.

OPC Foundation: OPC Unified Architecture Specification Part 14: PubSub Release 1.0411, XP055522628, URL: https://opcfoundation.org/developer-tools/specifications-unified-architecture/part-14-pubsub; 2018. pp. 1-166.

* cited by examiner

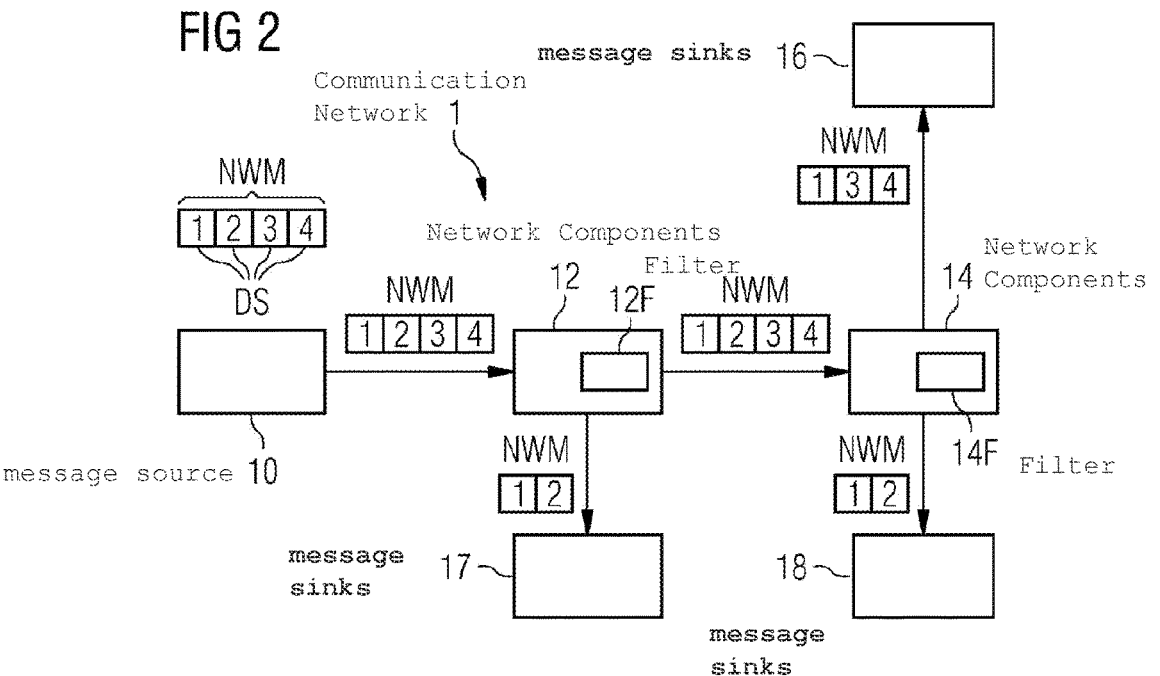

S1 Determine Network Topology

S2 Identify Data Stream

S3 Identify Filter Criterion

S4 Setup Filter

METHOD FOR CONFIGURING A COMMUNICATION NETWORK FOR THE CYCLICAL TRANSMISSION OF MESSAGES

CROSS REFERENCE TO RELATED APPLICATIONS

This present patent document is a § 371 nationalization of PCT Application Serial Number PCT/EP2019/061506, filed May 6, 2019, designating the United States, which is hereby incorporated in its entirety by reference.

FIELD

Embodiments relate to a method for configuring an industrial communication network with real-time capability for the cyclical transmission of messages.

BACKGROUND

In industrial communication networks, efforts are made to put as little load as possible on the networks during the transmission of data. This is intended to be achieved by virtue of unnecessary data not being transmitted at all via the communication network. Only through this may an intended real-time capability and the meeting of criteria associated therewith be reliably achieved.

However, the communication by the OPC UA PubSub Part 14 (Open Platform Communications Unified Architecture Publish/Subscribe) standard used in industrial communication networks counteracts the efforts. A typical industrial communication network includes a message source as sender, at least one message sink as receiver and at least one network component as respective connection element between the sender and receiver(s). In the case of communication by OPC UA PubSub, on the part of the message source (so-called publisher) data are drawn from a model, packed into respective groups of the model, and sent as messages (so-called network messages). A respective message sink (so-called subscriber) accepts the messages and checks which of the groups it has been subscribed to and uses the corresponding information from the messages. Groups that are irrelevant for a respective message sink are discarded by the message sink when the message is received. A load on the message sink is thus reduced through the discarding of unnecessary groups.

The communication network is however put under load by the unnecessary transmission of redundant information. This additional load has until now been accepted at the cost of the communication network, that however inflates the costs thereof and has a negative effect on the real-time capability of the data transmission with respect to latency times and/or jitter.

EP 2 355 403 discloses a method for distributing data by multicast, wherein the receivers and senders distribute their data via a publication/subscribe mechanism. Data packets may be filtered in this case based on available topology information in the network.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a method for configuring an industrial communication network with real-time capability for the transmission of messages and an industrial communication network with real-time capability, that are improved in terms of function and/or structure in such a way that the load on the communication network during the cyclical transmission of messages is kept as low as possible.

A method for configuring an industrial communication network with real-time capability for the cyclical transmission of messages is proposed. A respective message includes one or more datasets. The communication network includes a message source, at least one message sink and at least one network component as a component that forwards messages. The message source is configured to generate and cyclically send messages.

The at least one message sink is configured to receive and to process the messages. The at least one network component receives the messages from the message source or one of the network components and forwards same to the at least one message sink or one of the network components.

The method includes the step of determining a network topology of the communication network for the transmission of a data stream to be sent from the message source in the future, by virtue of the messages each being cyclically sent with all datasets.

The method includes the step of identifying which dataset or which of the datasets in the data stream a respective one of the message sinks would like to receive (that is to say subscribe to). A further step includes determining a respective filter for each network component, by virtue of the components connected to the respective network component, including message sinks and/or network components, and the datasets required for the connected message sinks being identified from the network topology. Finally, the method includes the step of setting up the respective filter in each network component, as a result of which, during operation of the communication network, received messages are filtered in the downstream direction of the data stream and only the datasets required downstream are transmitted in the messages. Required datasets are the datasets to which the message sinks are subscribed.

According to an embodiment, an industrial communication network with real-time capability is provided, that is configured for the cyclical transmission of messages. A respective message includes one or more datasets. The communication network includes a message source, that is configured to generate and to cyclically send messages, at least one message sink, that is configured to receive and to process messages, and at least one network component as a component that forwards messages, that receives the messages from the message source or one of the network components and forwards same to the at least one message sink or one of the network components. The communication network is configured to determine a network topology of the communication network for the transmission of a data stream to be sent from the message source in the future, in which the messages are each cyclically sent with all datasets. The communication network is further configured to identify which dataset or which of the datasets in the data stream a respective one of the message sinks would like to receive (that is to say subscribe to). The communication network is also configured to determine a respective filter for a network component, by virtue of the components connected to the respective network component, including message sinks and/or network components, and the datasets required for the connected message sinks being identified from the network topology. Finally, the communication network is configured to set up the respective filter in each network component, as a result of which, during operation of the communication network, received messages are filtered in the downstream direction of the data stream in the messages and only the required datasets are transmitted.

Embodiments eliminate unnecessary data traffic from the communication network at an early stage. To make this possible, an understanding about the data paths is first of all developed by determining the network topology of the communication network. In order to have knowledge about the content to be transmitted, it is identified which dataset or which of the datasets in the data stream a respective one of the message sinks would like to receive. The use of this information makes it possible to determine a respective filter for each network component present in the communication network, such that a portion of the datasets contained in the messages may be filtered out of the data stream by the filters with a high degree of probability, as a result of which the load on the communication network may be reduced. There is therefore distributed filtering of data information by application at a transport level. In this case, there is no restriction in the communication network, as would be expected in the case of a violation of a layer separation.

The proposed filtering method may be implemented in industrial communication networks since only the filter mechanism in the network components has to be added with respect to modern standards. Since an expansion by application is involved here, all of the remaining network traffic within the communication network is unaffected by the expansion. In this case, the data streams form a natural shield between the communication of different applications.

The communication network is based on the OPC UA PubSub standard. Accordingly, the message source is configured to generate the messages according to the OPC UA PubSub standard. In the case of communication by OPC UA PubSub, data are drawn from a model by the message source, packed into respective datasets and sent via the messages. The message sinks accept the messages and check the datasets they have subscribed to. Since datasets to which the message sinks have not been subscribed in the network component are already filtered out, there is no discarding of the non-subscribed datasets in the message sinks, that also results in a reduced load on the message sinks in addition to a reduced network load.

The determination of the network topology is preferably based on the IEEE 802.1 TSN (Time Sensitive Network) standard. TSN requires that the communication network has an understanding of the data paths, since the data paths are identified within the context of TSN itself. The step of determining the network topology may thus be realized by the known mechanisms of TSN. However, TSN does not have an understanding of the content of the messages or about the data transmitted via the data paths. By combining TSN with the mechanisms of OPC UA PubSub, it is thus possible to realize a filter mechanism that enables dynamic paths, that are set once, for content contained in the messages.

A further expedient configuration makes provision for each dataset in the message to be provided with a dataset identifier, a Dataset WriterID. The dataset identifier is processed in the filters as a filter criterion. The dataset identifiers may thus be used to forward the datasets that are significant for a relevant message sink, e.g., that the message sink has been subscribed to, on the data path. The dataset identifiers may be filtered in a simple manner since the dataset identifier is a value with n bits, for example n=16. The filtering may therefore be carried out selectively by a filter realized in software or in hardware.

The filter of each network component may be configured exclusively depending on the datasets required for the connected message sinks. In this case, the configuration includes the determination and setup of a respective filter.

The filter of each network component may be additionally configured depending on the network components connected in the downstream direction of the data stream and the datasets required for the message sinks connected thereto. To this end, for example, the network components may exchange data with one another by virtue of, for example, a respective subscriber passing through a path back in the direction of the message source in order to determine which datasets are required for the relevant subscriber or all of the subscribers provided downstream of a relevant network component. This procedure makes a significant reduction in the network load possible.

The respective filter may be determined and set up once before the data stream is synchronized and sent. As a result, paths that are dynamically planned once are defined with respect to the datasets subscribed to by a respective message sink and with respect to the message source.

The respective filter may be determined and set up by a superordinate computation unit, that obtains or requests from the message sinks the information regarding which dataset or which of the datasets in the data stream a respective one of the message sinks would like to receive (that is to say subscribe to). As an alternative, the respective filter may be determined and set up by a respective network component that obtains or requests from the message sinks the information regarding which dataset or which of the datasets in the data stream a respective one of the message sinks would like to receive (that is to say subscribe to). A respective network component obtains or requests from the network components connected in the downstream direction of the data stream the information regarding which dataset or which of the datasets in the data stream are needed. This corresponds to the passing through of the paths from behind in the direction of the message source, that is mentioned above.

Embodiments provide a method for the cyclical transmission of messages in a communication network.

A computer program product is also provided, that may be loaded directly into the internal memory of a digital computer and includes sections of software code, using which the steps of the method described herein are executed when the product is run on the computer. The computer program product may be embodied in the form of a physical storage medium, for example a USB memory stick, a DVD, a CD-ROM, a flash memory, and the like. The computer program product may likewise be configured in the form of a signal that may be loaded by a wireless or wired network.

The industrial communication network with real-time capability that is already described may furthermore include further components or steps that permit embodiments of the method to be carried out individually or in any combination.

BRIEF DESCRIPTION OF THE FIGURES

FIG. 1 depicts a schematic illustration of an industrial communication network in which a conventional transmission of a data stream takes place.

FIG. 2 depicts a schematic illustration of the industrial communication network shown in FIG. 1, in which a transmission of a data stream according to an embodiment takes place.

DETAILED DESCRIPTION

Figures 3, 4:
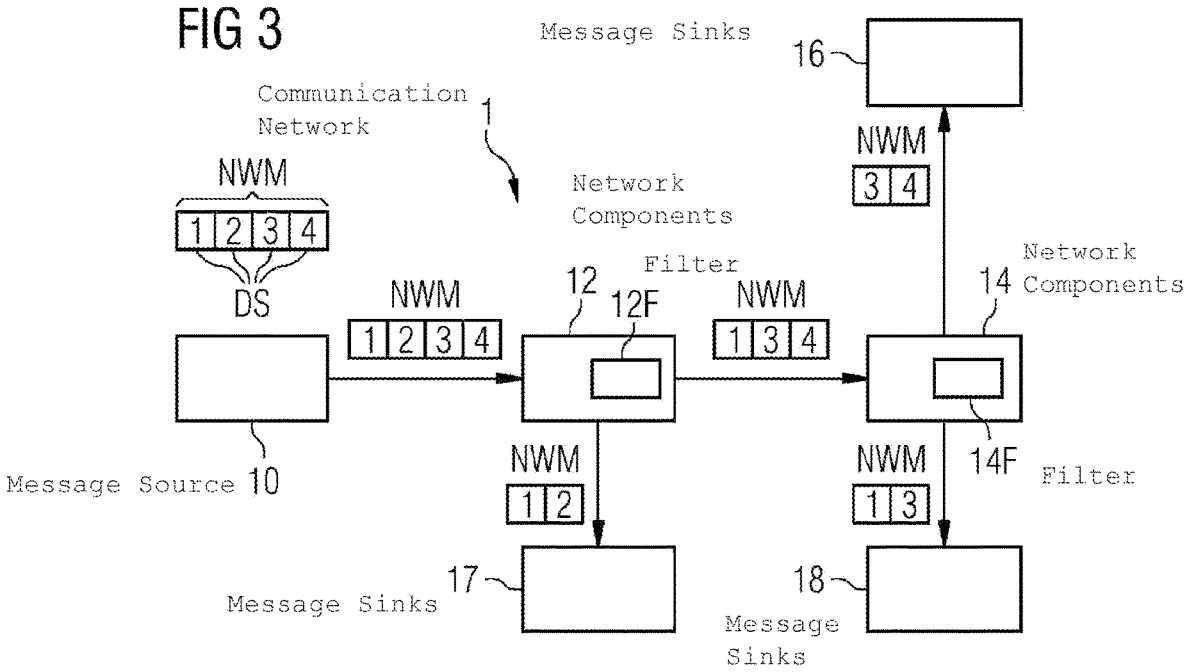
FIG. 3 depicts a schematic illustration of the industrial communication network shown in FIG. 1, in which a transmission of a data stream according to an embodiment takes place.
FIG. 4 depicts a flowchart that illustrates carrying out the steps of a method according to an embodiment.

FIG. 1 depicts a schematic illustration of a simple industrial communication network 1 with real-time capability. In the communication network 1 shown in FIG. 1, cyclic transmitted messages NWM are transmitted in a conventional manner from a sender to receivers.

The communication network 1 includes as sender a message source 10, that is also referred to as publisher. The message source 10 is configured to generate and cyclically send messages NWM. Each message NWM sent by the message source 10 includes a number of datasets DS. The cyclical sending of a plurality of messages NWM is referred to as data stream. The number of datasets DS in a message NWM may in principle be arbitrary, that is to say 1 or more. In this embodiment, it is assumed that a respective message NWM includes four different datasets "1", "2", "3" and "4", that for the sake of simplicity are subsequently referred to as DS1, . . . , DS4.

The communication network 1 includes as receiver of the messages NWM, for example, three message sinks 16, 17, 18, that are also referred to as subscribers. The number of message sinks may also be greater than or smaller than three. The message sinks 16, 17, 18 are configured to receive the messages NWM and to process the datasets DS contained in the messages NWM or else only a portion of the datasets DS. The message sinks 16, 17, 18 are not directly connected to the message source 10. Instead, a number of network components 12, 14 are provided as conveying or forwarding component, that connects the message source 10 and the message sinks 16, 17, 18 in the communication network 1. The network components 12, 14 are bridges, for example. The messages NWM are then transported via the network components 12, 14 along predetermined paths of the interconnection to the message sinks 16, 17, 18.

In this embodiment, only two network components 12, 14 are depicted. The number may also be greater than or less than two. In the topology shown here purely by way of example, the network component 12 is connected to the message source 10. The network component 14 and the message sink 17 are also connected to the network component 12 in the downstream direction of the flow of data coming from the message source 10. The message sinks 16, 18 are in turn connected in the downstream direction to the network component 14.

The cyclical transmission of the messages NWM in the communication network 1 takes place in a communication according to the OPC UA PubSub standard. In this case, the datasets DS1, . . . , DS4 are identified by the message source 10 according to a model (not shown), packed into the message NWM and sent as a data stream, for example as a cyclical sequence of messages NWM with all datasets DS1, . . . , DS4. The messages NWM are transmitted in a cyclical sequence from the message source 10 as broadcast messages to the network component 12. The network component 12 for its part transmits the messages NWM to the network component 14 and to the message sink 17 directly connected thereto. The network component 14 transmits the messages NWM in turn to the message sinks 16, 18.

As is clear from the illustration according to FIG. 1, in which the content of the messages NWM is illustrated at the output of each component up to the receiver, the messages NWM are forwarded unchanged from the network components 12, 14 to the connected message sinks 16, 17, 18. The message sinks 16, 17, 18 accept the messages NWM and check which datasets DS they are assigned to, that is to say which datasets are intended to be received. In the embodiment according to FIG. 1, the data sink 16 for example has subscribed to the datasets DS1, DS3, DS4. The data sink 17 has subscribed to the datasets DS1, DS2 and the data sink 18 has subscribed to the datasets DS1, DS2. The respective datasets that have not been subscribed to are then discarded in the respective data sink 16, 17, 18. This means the message sink 16 discards the dataset 2 and the message sinks 17, 18 discard the datasets 3 and 4.

It may readily be seen that in this case the communication network 1 is subjected to a high data load, irrespective of the datasets processed by the message sinks 16, 17, 18.

FIG. 2 depicts an embodiment that permits the cyclical transmission of the messages NWM with a reduced load. The topology corresponds here to the topology described in connection with FIG. 1.

The communication network 1 shown in FIG. 2 also uses a communication by OPC UA PubSub, for example the message source 10 sends messages NWM with the datasets DS1, . . . , DS4 contained therein in a cyclical sequence. In order to reduce the network load, the network topology of the communication network 1 is determined once (step S1 in FIG. 4) for the transmission of the data stream to be sent from the message source 10. In this first step, an understanding about the data paths of the communication network is thus identified by virtue of the physical arrangement of the components connected to one another, namely the message source 10, the at least one network component 12, 14 and the at least one message sink 16, 17, 18 by a transmission medium (line or wireless communication connection) being identified. The determination of the network topology may be based on the TSN (Time Sensitive Network) standard.

In a next step S2 (FIG. 4), which dataset or which of the datasets DS1, . . . , DS4 in the data stream a respective one of the message sinks 16, 17, 18 would like to receive, that is to say has subscribed to, is identified. In this second step, an understanding about the content required by the message sinks is thus identified. In the embodiment depicted in FIG. 2, it is assumed that the message sink 16 has subscribed to the datasets DS1, DS3 and DS4 and the message sinks 17, 18 have subscribed to the datasets DS1, DS2.

The steps S1 and S2 may be carried out by a superordinate computation unit (not illustrated) once or after each change to the network topology, on account of the addition or removal of components. Within the context of step S2, for example, the superordinate computation unit may actively request the datasets required (that is to say subscribed to) by the message sinks 16, 17, 18 or obtain the information therefrom within the context of an initiation step. As an alternative, the information regarding which datasets DS1, . . . , DS4 are intended to be received by a respective message sink 16, 17, 18 may be requested or obtained by corresponding computation units of the network components 12, 14.

If, in addition to the understanding of the data paths, it is known in which scope information is required by the message sinks 16, 17, 18, it is thus possible to determine in a step S3 (FIG. 4) a respective filter criterion or filter 12F, 14F for each component that forwards the messages. Components that forward messages are the network components 12, 14. In this case, the components, including message sinks 16, 17, 18 and/or network components 14, connected downstream to the respective network component 12, 14 and the datasets DS1, . . . , DS4 required for the connected message sinks 16, 17, 18 are identified from the network topology.

In step S3, as filter criterion for the filter 12F, it is thus identified, according to which the network component 12 needs to forward only the datasets DS1, DS2 to the message sink 17 directly connected thereto. A transmission of the datasets DS3, DS4 not needed by the message sink 17 is accordingly not required by the network component 12.

The message NWM to the message sink 17 therefore only needs to include the datasets DS1, DS2. In contrast, in this embodiment, the network component 12 has to transmit the message NWM with all datasets DS1, . . . , DS4 to the network component 14 according to the overlap of all necessary datasets DS of the components connected downstream. As filter criterion of the filter 14F of the network component 14, it is determined that the message sink 16 needs only the datasets DS1, DS3, DS4 and the message sink 18 requires the datasets DS1, DS2. The message NWM to the message sink 16 therefore only needs to include the datasets DS1, DS2, DS3. The message NWM to the message sink 18 only needs to include the datasets DS1, DS2.

In a step S4 (FIG. 4), the respective filter 12F, 14F is then set up in the associated network component 12, 14. This means the filter 12F is set up in the network component 12 and the filter 14F is set up in the network component 14. As a result, during operation of the communication network 1, only the required datasets may be transmitted in the messages NWM in the downstream direction of the data stream.

The messages NWM may be filtered by the filters 12F, 14F easily using a dataset identifier (not explicitly illustrated). To this end, each dataset DS1, . . . , DS4 in the message NWM is provided with a dataset identifier. The dataset identifier is then processed as filter criterion in the filters 12F, 14F. The filters 12F, 14F may be realized either in software or hardware. A realization in hardware is easily possible for example when the dataset identifiers already mentioned are realized as filter criterion.

In the configuration depicted in FIG. 2, the filter 12F, 14F of each network component 12, 14 is configured exclusively depending on the datasets required for the connected message sinks 16, 17, 18. In this case, the configuration includes the determination and setup of a respective filter. It is clear from the embodiment described above that the network component 12 transmits the message received by the message source 10 to the network component 14 unchanged, that is to say the message NWM includes all datasets DS1, . . . , DS4.

FIG. 3 depicts an embodiment based on the same network topology and in which the filters 12F, 14F of the network components 12, 14 are configured according to the datasets to which the message sinks 16, 17, 18 have subscribed. To illustrate this example, it is assumed that, in contrast to FIG. 2, the message sink 16 has subscribed to the datasets DS3, DS4 and the message sink 18 has subscribed to the datasets DS1, DS3. The network component 14 therefore does not have a component connected in the downstream direction that processes (has subscribed to) the dataset DS2. Within the context of step S2, in which it is identified which dataset or which of the datasets in the data stream a respective one of the message sinks would like to receive, the network component 14 may transmit to the network component 12 the information that the dataset DS2 is not needed.

The network component 12 subsequently transmits to the network component 14 a message NWM in which only the datasets DS1, DS3, DS4 but not the dataset DS2 are included. This results in a further reduction in the network load.

The described procedure provides the distributed filtering of data information by application at a transport level. Distributed filtering, therefore, since the filters in the different network components are provided with different filter configurations. This strongly contradicts the separation of the network layer. Within the context of the invention, this approach is advantageously taken into account in order to significantly reduce the overall network load. In this case, there is no restriction in the communication network, as would be expected in the case of a violation in the layer separation.

With respect to modern standards, a respective dataset identifier, that may then be processed in the filters 12F, 14F, must be added only to the datasets DS1, . . . , DS4.

Since an expansion by application in the network components 12, 14 is involved here, all of the remaining network traffic in the communication network is unaffected. In this case, data streams form a natural shield between a communication of different applications.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for configuring a communication network with real-time capability for a cyclical transmission of messages, wherein a respective message comprises one or more datasets, and wherein the communication network comprises a message source that is configured to generate and to cyclically send messages, one or more message sinks configured to receive and to process the messages, and a network component of one or more network components that receives the messages from the message source or another network component of the one or more network components and forwards the messages to the one or more message sinks or a further network component of the one or more network components, the method comprising:

determining a network topology of the communication network for a transmission of a data stream to be sent from the message source in the future, in which the messages are each cyclically sent with all of the one or more datasets;

identifying which dataset or which of the datasets of the one or more datasets in the data stream a respective one of the message sinks would like to receive;

determining a respective filter for each network component of the one or more network component by virtue of message sinks, network components, or message sinks and network components connected to the respective communication network, and the datasets required for the connected message sinks identified from the network topology; and setting up the respective filter in each network component of the one or more network components, as a result of which, during operation of the communication network, received messages are filtered in a downstream direction of the data stream in the messages and only required datasets are transmitted.

2. The method of claim 1, wherein the communication network is based on an Open Platform Communications Unified Architecture Publish/Subscribe (OPC UA PubSub) standard.

3. The method of claim 1, wherein the determination of the network topology is based on a Time Sensitive Network (TSN) standard.

4. The method of claim 1, wherein each dataset in the message is provided with a dataset identifier, wherein the dataset identifier is processed in the filters as a filter criterion.

5. The method of claim 1, wherein the filter of each network component is configured exclusively depending on the datasets required for the connected message sinks.

6. The method of claim 1, wherein the filter of each network component is configured depending on the network components connected in the downstream direction of the data stream and the datasets required for the message sinks connected thereto.

7. The method of claim 1, wherein a respective filter is determined and set up once before the data stream is synchronized and sent.

8. The method of claim 1, wherein a respective filter is determined and set up by a superordinate computation unit that obtains or requests from the message sinks information regarding which dataset or which of the datasets in the data stream a respective one of the message sinks would like to receive.

9. The method of claim 1, wherein the respective filter is determined and set up by the respective network component that obtains or requests from the message sinks information regarding which dataset or which of the datasets in the data stream a respective one of the message sinks of the one or more message sinks would like to receive.

10. The method of claim 9, wherein a respective network component obtains or requests from the network components connected in the downstream direction of the data stream information regarding which dataset or which of the datasets in the data stream are needed.

11. The method of claim 1, wherein the filtering is carried out by a filter implemented in software or hardware.

12. A communication network with real-time capability, that is configured for a cyclical transmission of messages, wherein a respective message comprises one or more datasets, the communication network comprising:

a message source device configured to generate and to cyclically send the messages;

at least one message sink device configured to receive and to process the messages;

a network component device of a plurality of network component devices that receive the messages from the message source device or one or more other network component devices of the plurality of network component devices and forwards the messages to the at least one message sink device or one of the one or more other network component devices;

wherein the communication network is configured to:

determine a network topology of the communication network for the transmission of a data stream to be sent from the message source device in the future, in which the messages are each cyclically sent with all datasets;

identify which dataset or which of the datasets in the data stream a respective message sink device of the at least one message sink devices would like to receive;

determine a respective filter for each network component, by virtue of the message sink devices and/or network component devices connected to the respective network component device of the plurality of network component devices, and the datasets required for the connected message sinks identified from the network topology; and set up the respective filter in each network component device, as a result of which, during operation of the communication network, only required datasets are transmitted in a downstream direction of the data stream in the messages.

13. The communication network of claim 12, wherein the communication network is based on an Open Platform Communications Unified Architecture Publish/Subscribe (OPC UA PubSub) standard.

14. The communication network of claim 12, wherein the determination of the network topology is based on a Time Sensitive Network (TSN) standard.

15. The communication network of claim 12, wherein each dataset in the message is provided with a dataset identifier, wherein the dataset identifier is processed in the filters as a filter criterion.

16. The communication network of claim 12, wherein the filter of each network component device is configured exclusively depending on the datasets required for the connected message sink devices.

17. The communication network of claim 12, wherein the filter of each network component device configured depending on the network component devices connected in the downstream direction of the data stream and the datasets required for the message sink devices connected thereto.

18. The communication network of claim 12, wherein a respective filter is determined and set up once before the data stream is synchronized and sent.

19. The communication network of claim 12, wherein a respective filter is determined and set up by a superordinate computation unit that obtains or requests from the message sink devices information regarding which dataset or which of the datasets in the data stream a respective one of the message sink devices would like to receive.

20. The communication network of claim 19, wherein a respective network component device obtains or requests from the network component devices connected in the downstream direction of the data stream information regarding which dataset or which of the datasets in the data stream are needed.

* * * * *